(12) United States Patent
Sweet

(10) Patent No.: US 11,304,047 B2
(45) Date of Patent: Apr. 12, 2022

(54) REAL-TIME INCIDENT REPORTING AND ALERT SYSTEM

(71) Applicant: James Walker, Stafford (AU)

(72) Inventor: Garry Sweet, Springwood (AU)

(73) Assignee: James Walker, Stafford (AU)

( * ) Notice: Subject to any disclaimer, the term of this patent is extended or adjusted under 35 U.S.C. 154(b) by 0 days.

(21) Appl. No.: 16/971,382

(22) PCT Filed: Feb. 25, 2019

(86) PCT No.: PCT/AU2019/050157
§ 371 (c)(1),
(2) Date: Aug. 20, 2020

(87) PCT Pub. No.: WO2019/161458
PCT Pub. Date: Aug. 29, 2019

(65) Prior Publication Data
US 2020/0404476 A1 Dec. 24, 2020

(30) Foreign Application Priority Data

Feb. 23, 2018 (AU) ............................... 2018900586

(51) Int. Cl.
| | |
|---|---|
| *H04W 4/90* | (2018.01) |
| *H04W 8/26* | (2009.01) |
| *H04W 4/021* | (2018.01) |
| *H04M 1/725* | (2021.01) |
| *H04M 1/72424* | (2021.01) |

(52) U.S. Cl.
CPC ......... *H04W 4/90* (2018.02); *H04M 1/72424* (2021.01); *H04W 4/021* (2013.01); *H04W 8/26* (2013.01)

(58) Field of Classification Search
CPC ... H04W 4/90; H04W 4/021; H04M 1/72424; G08B 25/12; G08B 25/016; G08B 27/001; G08B 21/02
See application file for complete search history.

(56) References Cited

U.S. PATENT DOCUMENTS

| | | | |
|---|---|---|---|
| 8,890,685 B1* | 11/2014 | Sookman | G08B 25/008 340/539.13 |
| 2013/0183924 A1* | 7/2013 | Saigh | A61K 31/198 455/404.2 |
| 2014/0365390 A1 | 12/2014 | Braun | |

(Continued)

OTHER PUBLICATIONS

International Search Report & Written Opinion related to Application No. PCT/AU2019/050157; reported on Mar. 4, 2019.

(Continued)

*Primary Examiner* — Minjung Kim
(74) *Attorney, Agent, or Firm* — von Briesen & Roper, s.c.

(57) ABSTRACT

A real-time, interactive incident reporting and alert system and method is provided. The system includes at least one server configured to: receive, from a user device, an incident report, the incident report including an identifier of a user associated with the user device, a location associated with an incident, and information relating to the incident; identify a plurality of users in proximity to the location; and transmit an alert to a plurality of user devices associated with the plurality of users to inform the plurality of users of the incident.

17 Claims, 8 Drawing Sheets

(56) References Cited

U.S. PATENT DOCUMENTS

| | | | |
|---|---|---|---|
| 2015/0111524 A1* | 4/2015 | South | H04W 4/021 455/404.2 |
| 2019/0141003 A1* | 5/2019 | Cottle | G06Q 50/01 |
| 2019/0318596 A1* | 10/2019 | Pacella | B64C 39/024 |
| 2021/0127226 A1* | 4/2021 | Sutherland | H04W 4/029 |

OTHER PUBLICATIONS

Active Shooter Guidelines for Places of Mass Gathering [retrieved Mar. 27, 2019] URL:https://web.archive.org/web/20150319215647/http://www.nationalsecurity.gov.au/Media-and-publications/Publications/Documents/active-shoater-guidelines-places-mass-gathering.pdf published on Mar. 19, 2015 as per Wayback Machine; Appendix C.

* cited by examiner

REAL-TIME INCIDENT REPORTING AND ALERT SYSTEM

CROSS-REFERENCE TO RELATED APPLICATION

This Application is a 35 USC § 371 US National Stage filing of International Application No. PCT/AU2019/050157 filed on Feb. 25, 2019 and claims priority under the Paris Convention to Australian Patent Application No. 2018900586 filed on Feb. 23, 2018.

FIELD OF THE DISCLOSURE

The present invention relates to incident reporting and alerts.

BACKGROUND OF THE DISCLOSURE

Large-scale incidents, such as mass-shootings, are unfortunately becoming a more common occurrence in society, and can have a significant impact on society through injury, loss of life damage to property.

Traditionally, these incidents are reported to authorities (e.g. police) by phone, upon which the incident is delegated to a response team, who attends the area and attempts to control the incident. More recently, the reporting of incidents via computer and other means is also provided.

One problem with such traditional reporting and response methods is that fake or misleading incident reports are commonplace, which means that it is generally time consuming to filter reports and take appropriate action. Furthermore, even if an incident is real, it is generally very difficult for investigators to contact those that have reported the incident for further investigation as the reports are generally made anonymously. Yet further again, it is generally difficult to get good information from these reports, particularly if the user is attempting to make a report while keeping noise levels to a minimum.

Another problem with such traditional reporting and response methods is that people in the vicinity of the incident generally don't know about the incident until it is under control, which means that they cannot effectively protect themselves between when the incident starts and when the incident is under control. This in turn can cause unnecessary injury to persons (e.g when a person thinks a threat is over before it is), or unnecessary psychological trauma (e.g. when a person is in hiding for long periods after a threat is over).

Certain attempts have been made to warn the public of incidents as they are occurring. As an illustrative example, reports of incidents may be broadcast on television and radio warning people to stay away from an area. However, such reports may create unwanted attention to the area in which the incident is occurring, and are unlikely to be received by those directly involved (particularly if people are in hiding).

As such, there is clearly a need for an improved real-time incident reporting and alert system.

It will be clearly understood that, if a prior art publication is referred to herein, this reference does not constitute an admission that the publication forms part of the common general knowledge in the art in Australia or in any other country.

SUMMARY OF THE DISCLOSURE

The present invention is directed to a real-time, interactive, incident reporting and alert system, which may at least partially overcome at least one of the abovementioned disadvantages or provide the consumer with a useful or commercial choice.

With the foregoing in view, the present invention in one form, resides broadly in a real-time, interactive incident reporting and alert system including at least one server configured to:

receive, from a user device, an incident report, the incident reports including an identifier of a user associated with the user device, a location associated with an incident, and information relating to the incident;

identify a plurality of users in proximity to the location; and transmit an alert to a plurality of user devices associated with the plurality of users, to inform the plurality of users of the incident.

Advantageously, the real-time incident reporting and alert system enables both users to quickly and accurately report incidents, as well as be alerted of incidents in their vicinity. As a result, users are more likely to become aware of an incident in a timely manner, and be able to thus take appropriate action in a timely manner, which in turn may significantly reduce the impact and casualty rate of the incident.

Preferably, the incident report includes an incident category. The incident category may include an armed person incident category, a hostile vehicle incident category, a fire or explosion incident category, and a medial incident category.

The incident report may also include information regarding those injured in the incident, information regarding an offender or offenders, a description of the incident, and/or one or more media files relating to the incident. The media files may include video and/or images.

Preferably, the at least one server is configured to receive details of an identity of the user, and associate the identity with the user device. The at least one server may further be configured to verify the identify of the user.

Preferably, the at least one server is configured to identify a location of each of the plurality of users prior to receiving the incident report, in order to efficiently identify the plurality of users in proximity to the location of the incident.

The at least one server may be further configured to determine one or more recommended responses based upon the incident report, and provide the recommended response to a security user.

The at least one server may be configured to allocate the incident to a security user of a plurality of security users for initial action.

The at least one server may be configured to receive an alert configuration from the security user, and generate the alert based thereon. The alert configuration may include information defining a proximity to the incident defining the plurality of users to which the alert is to be sent (e.g. 1 km).

The at least one server may be configured to generate updated alerts based upon a change in an incident, or if further information is made available about an incident. The updated alerts may be provided to the same or a different group of users.

The at least one server may be configured to receive multiple incident reports from multiple users.

The at least one server may be configured to automatically identify common incidents based on the multiple incident reports.

The at least one server may be configured to collate multiple incident reports relating to a common incident. The at least one server may be configured to identify new information from subsequent reports, and selectively forward the new information to the security user.

The at least one server may be configured to transmit an alert indicating that the incident has been contained upon receiving confirmation of same. The alert indicating that the incident has been contained may be sent to all users that have previously received an alert.

The at least one server may be configured to provide a graphical user interface (GUI) to the user device, the GUI enabling the user to generate the incident report. The GUI may enable the user to select an incident category with a single selection. The GUI may enable the user to identify if the incident is urgent or non-urgent and/or other incidents with a single selection.

The GUI may enable the user to select the location with reference to a map element. A location of the user may be provided on the map element for reference. One or more points of interest (POIs) may be provided on the map element for reference. The GUI may enable the user to select the location using a drag-and-drop element.

The GUI may enable the user to select whether the incident is moving, and in such case input a direction of movement associated with the incident.

The location of the incident report may define the location of the user and the location of the incident.

The GUI may be provided in an application for installation on the user device. The alert may be provided through the same application that includes the GUI.

The alert may be provided on the user device as a notification. The alert may be provided on the lock screen of the user device, even if the application is not open.

The alert may be selectable, upon which further information and/or instructions relating to the incident are opened. In particular, upon opening the alert, the user device may connect to the server and retrieve the further information and/or instructions therefrom, for display to the user.

The alert may enable the user to confirm receipt of the instructions thereof.

The information and/or instructions may be provided based upon the user's proximity to the incident. The user's proximity to the incident may be defined according to zones. As an illustrative example, if the user is in a red zone, he or she may be instructed to hide, if in an amber zone instructed to run and in what direction, and if in a green zone instructed to stay away.

The server may use artificial intelligence to generate the information and/or instructions. The server may update the instructions as the threat moves and potentially update the zone of the user.

The at least one server may be configured to provide a GUI to one or more first responders and/or security users. The GUI may include, a visual heat map based representation illustrating a location of the offender(s), their movements and proximity to users in accordance with one or more zones (e.g. red, amber and green zones). The GUI may include an indication of which users have confirmed receipt of the alert.

The at least one server may be configured to save reports for later investigation, and associate each saved report with the user that made the report.

The incident reports may be encrypted.

In another form, the invention resides broadly in a real-time, interactive incident reporting and alert method including:

receiving, from a user device, an incident report, the incident reports including an identifier of a user associated with the user device, a location associated with an incident, and information relating to the incident;

identifying a plurality of users in proximity to the location; and transmitting an alert to a plurality of user devices associated with the plurality of users to inform the plurality of users of the incident.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF THE DRAWINGS

Various embodiments of the invention will be described with reference to the following drawings, in which:

FIG. 8 illustrates a screenshot of a fourth incident reporting screen of the system of FIG. 1, as shown to the user on the smartphone, according to an embodiment of the present invention;

Preferred features, embodiments and variations of the invention may be discerned from the following Detailed Description which provides sufficient information for those skilled in the art to perform the invention. The Detailed Description is not to be regarded as limiting the scope of the preceding summary of the invention in any way.

DETAILED DESCRIPTION OF THE DISCLOSURE

Figure 1:
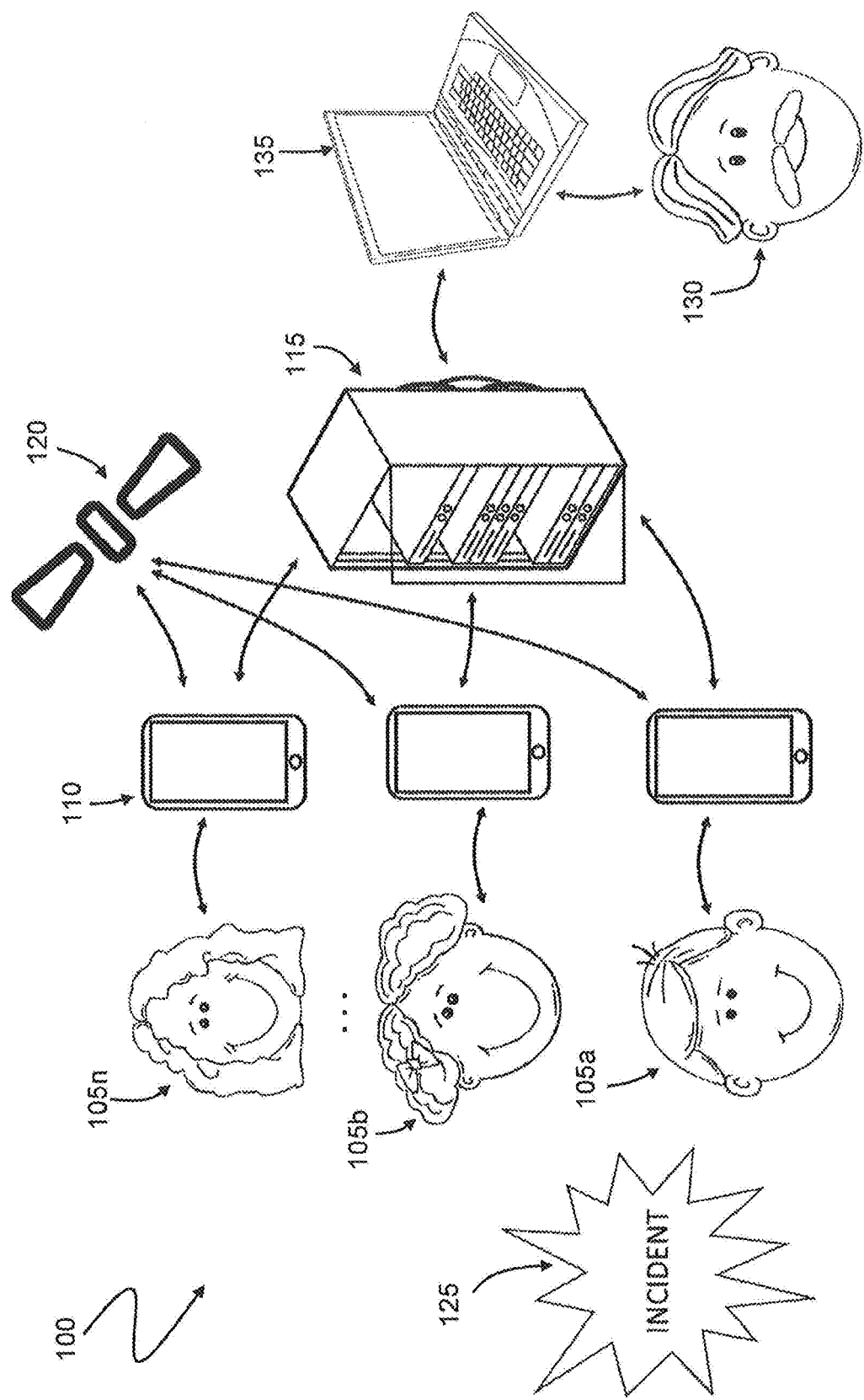
FIG. 1 illustrates an incident reporting and alert system, according to an embodiment of the present invention.

FIG. 1 illustrates an incident reporting and alert system 100, according to an embodiment of the present invention. The incident reporting and alert system 100 enables both users to quickly and accurately report incidents, including detailed location information, as well as be alerted of incidents in their vicinity. As a result, the system 100 enables users to become aware of an incident in a timely manner (or make others aware), and thus take appropriate action. As such, the system 100 has the ability to significantly reduce the impact and casualty rates of such incidents.

Initially, a plurality of users 105a-n each register to the system 100 to enable them to report incidents and receive alerts. This is generally achieved by downloading an application, which is installed on smartphones 110 associated with each of the users 105a-n. Registration is advantageously promoted through an organisation with which the users 105a-n are associated, such as a university, aid organisation, employer or the like.

Once the application is installed, each of the users 105a-n are prompted to enter their details into the application, which are then verified and associated with the user 105a-n. This step is important as it enables reports of a user 105a-n to be associated with details of that user 105a-n. This enables a security user, for example, to follow up with the user 105a-n after the incident has been contained for the purpose of investigation, and prevents (or at least reduces) the number of fake incident reports received.

Figures 2, 3:
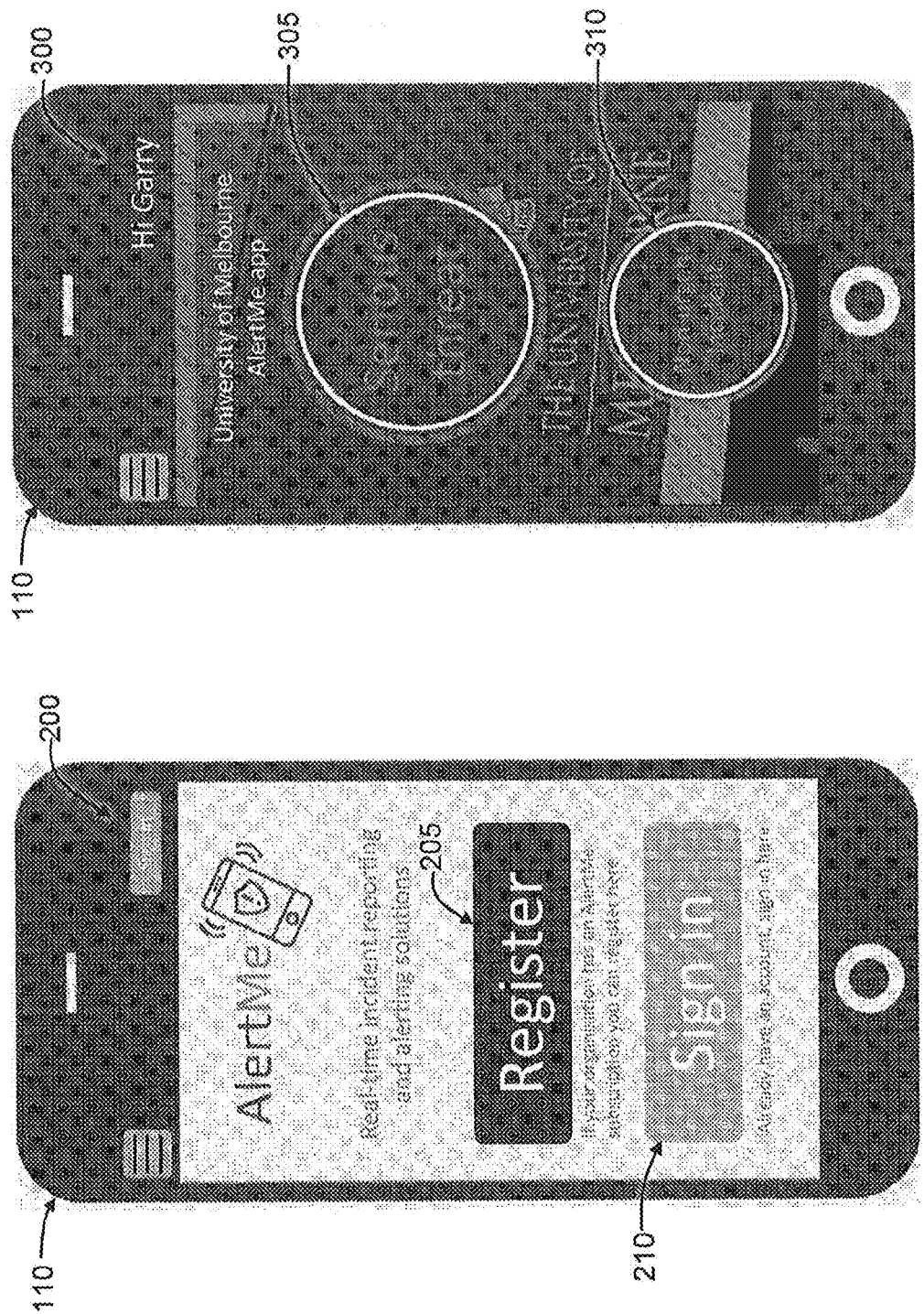
FIG. 2 illustrates a screenshot of a start-up screen of the system of FIG. 1, as shown to a user on a smartphone, according to an embodiment of the present invention.
FIG. 3 illustrates a screenshot of a first incident reporting screen of the system of FIG. 1, as shown to the user on the smartphone, according to an embodiment of the present invention.

FIG. 2 illustrates a screenshot 200 of a start-up screen of the system 100, as shown to a user 105a-n on the smartphone 110, according to an embodiment of the present invention. The start-up screen includes a register button 205, which enables the user 105a-n to generate an account and enter his or her details. When entering the details, the user 105a-n is generally prompted to enter his or her name, address, telephone number as well as any other data needed to identify the user 105a-n. This data is then uploaded to a central server 115, where it is processed and verified, and associated with the user 105a-n in a database.

If the user 105a-n has already registered for the system 100 (e.g. the user 105a-n is simply replacing his or her smartphone 110 and reinstalling applications on the new smartphone 110), the user 105a-n may skip the registration screen, and simply enter his or her credentials (e.g. username and password) by selecting a sign-in button 210.

Once the users 105a-n have registered or signed in, the applications simply run in the background of the smartphones 110 until they are needed. When running in the background, each application may track a location of the respective user 105a-n using global positioning system (GPS) data from one or more satellites 120 (or obtain location data by other means), and upload such location data periodically to the server 115. This enables the server 115 to quickly identify a location of each of the users 105a-n, to in turn be able to quickly identify which of the users 105a-n is in proximity to the incident.

In case a first user 105a observes an incident 125, he or she simply takes the smartphone 110, opens the application, and reports the incident, as outlined below.

FIG. 3 illustrates a screenshot 300 of a first incident reporting screen of the system 100, as shown to the user 105a on the smartphone 110, according to an embodiment of the present invention. The first incident reporting screen of the system 100 includes a serious threat button 305, and a non-urgent and/or other incident button 310, and thus enables the user 105a to report either a serious threat or a non-urgent and/or other incident, respectively.

Figure 4:
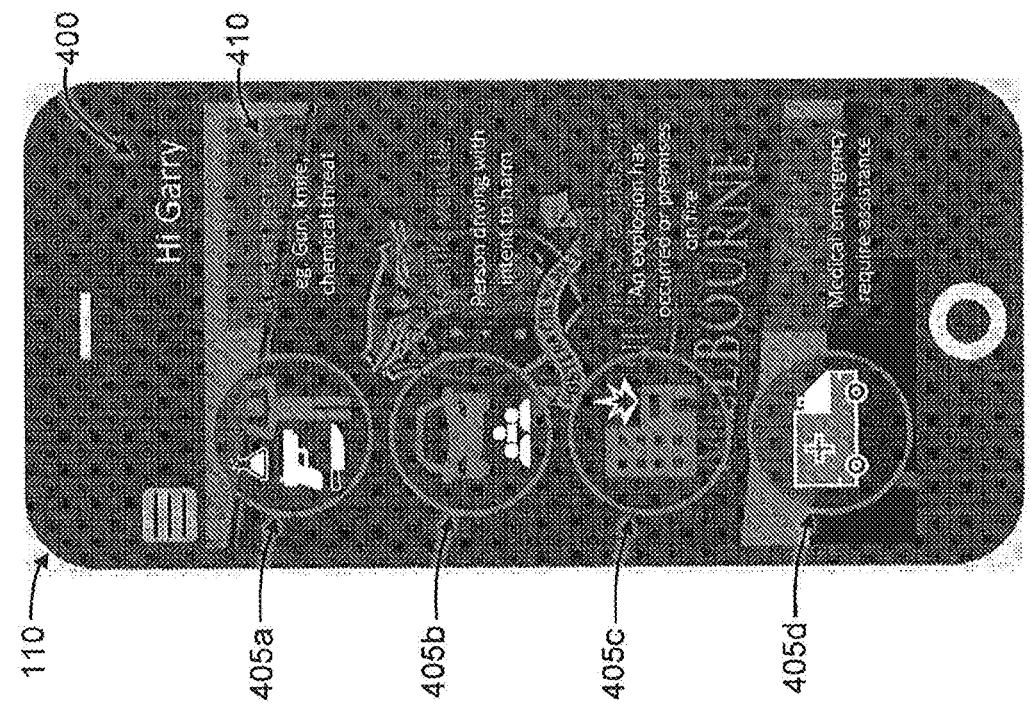
FIG. 4 illustrates a screenshot of a second incident reporting screen of the system of FIG. 1, as shown to the user on the smartphone, according to an embodiment of the present invention.

In case the serious threat button 305 is selected, a second incident reporting screen of the system 100 is shown, requesting further information from the user 105a. FIG. 4 illustrates a screenshot 400 of the second incident reporting screen of the system 100, as shown to the user 105a on the smartphone 110, according to an embodiment of the present invention.

The second incident reporting screen includes a plurality of incident type buttons 405a-405d, each associated with a type of incident. The incident type buttons include an armed person incident button 405a, a hostile vehicle incident button 405b, a fire or explosion incident button 405c, and a medical incident button 405d, for reporting an armed person incident, a hostile vehicle incident, a fire or explosion incident, and a medical incident, respectively.

Each of the incident type buttons 405a-405d is associated with a textual description of the incident type in an incident description field 410, and the incident type buttons 405a-405d comprise a graphical representation of the incident type with which it relates, together which assists the user 105a in selecting a button when under stress.

Figure 5:
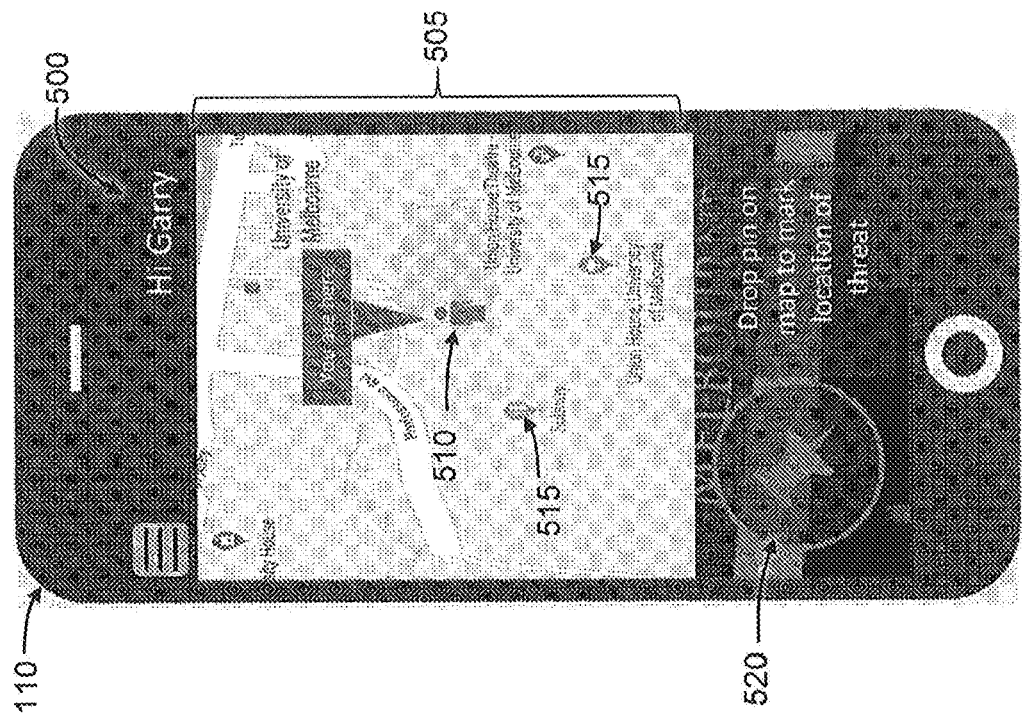
FIG. 5 illustrates a screenshot of a third incident reporting screen of the system of FIG. 1, as shown to the user on the smartphone, according to an embodiment of the present invention.

Once the user 105a has selected an incident type using an incident type button 405a-405d, a third incident reporting screen of the system 100 is shown, requesting location information from the user. FIG. 5 illustrates a screenshot 500 of the third incident reporting screen of the system 100, as shown to the user 105a-n on the smartphone 110, according to an embodiment of the present invention.

The third incident reporting screen includes a map element 505, on which a user location indicator 510 is displayed together with a plurality of point of interest elements 515. The location indicator 510 and the point of interest elements 515 enable the user 105a to get a quick overview of their surroundings with reference to the map element 505.

The third incident reporting screen includes a drag-and-drop pin element 520, which is configured to be dragged onto the map element 505 to enable the user 105a-d to illustrate where the incident 125 is. This is particularly useful as the user's location may not be a good indicator of the incident location, and the more accurate the incident location is, the more quickly the incident is able to be handled. As an illustrative example, the user may be viewing an incident in an adjacent street from an upper level of a building.

This is also useful as it may be used to provide information to first respondents both relation to a location of the incident and a location of the user (and thus an exact location from where the incident or event is being viewed). The drag and drop map element also enables an event location to be moved, even if the user witnessing the event remains stationary.

Once the location of the incident 125 is entered, a pin 605 indicating the selected location is provided on the map, and a pop-up element 610 is provided requesting the user to confirm whether the incident (threat) is moving, and in such case to indicate a direction of the threat.

Figures 6, 7:
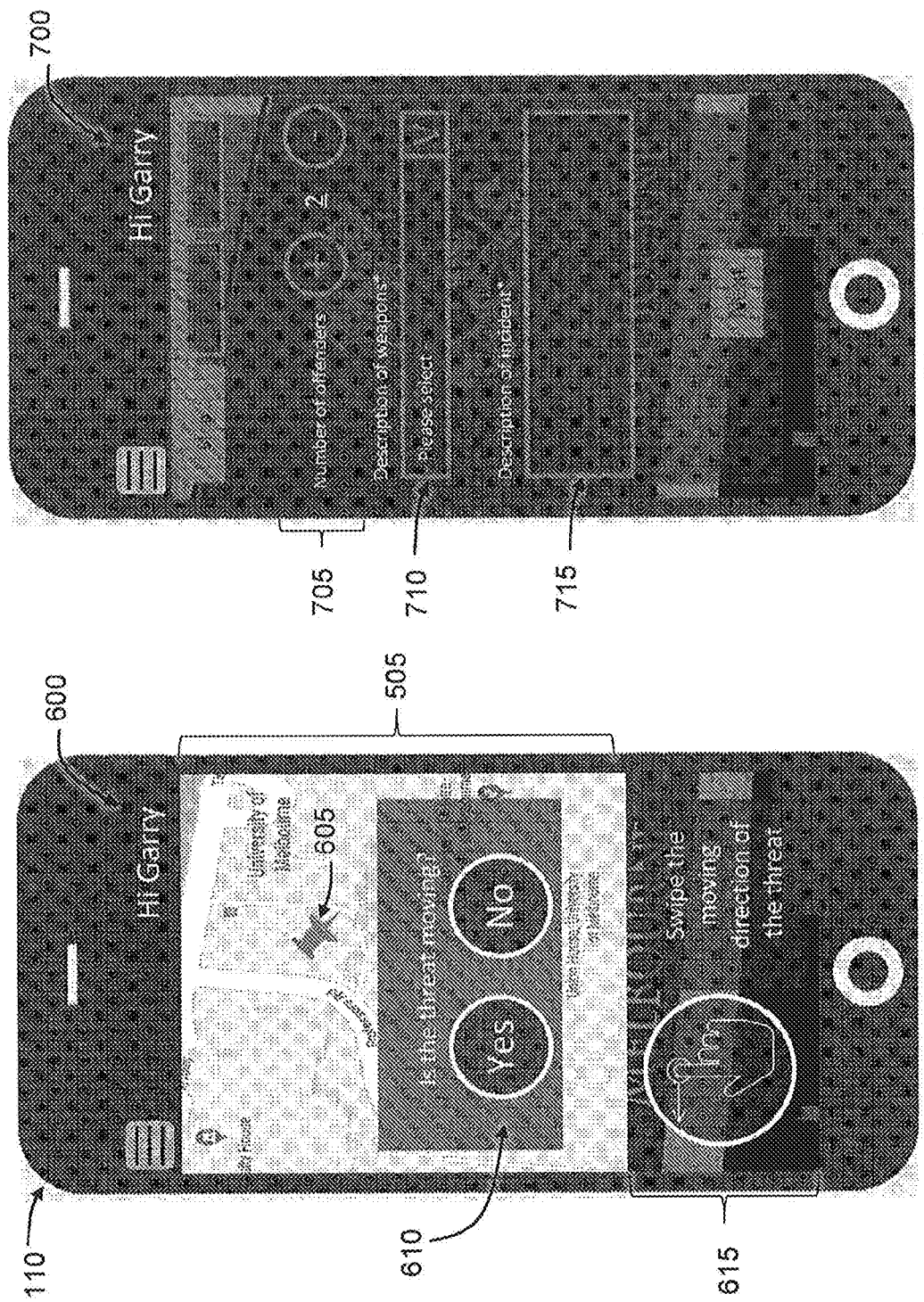
FIG. 7 illustrates a screenshot of a fourth incident reporting screen of the system of FIG. 1, as shown to the user on the smartphone, according to an embodiment of the present invention.

FIG. 6 illustrates a screenshot 600 of the third incident reporting screen with the pop-up element 605 thereon, requesting the user to indicate whether the incident is moving by selecting a 'yes' button or a 'no' button of the pop-up. In such case, the user 105a is instructed to swipe on a touchscreen of the user device in a direction corresponding to the direction the incident is moving. An instruction overlay 615 also provides such instructions for the convenience of the user.

Once the direction of the incident 125 is entered by the user 105*a* (or confirmation is provided that the incident is not moving), a fourth incident reporting screen of the system 100 is shown, requesting offender information from the user. FIG. 7 illustrates a screenshot 600 of the fourth incident reporting screen of the system 100, as shown to the user 105*a-n* on the smartphone 110, according to an embodiment of the present invention.

The fourth incident reporting screen includes a number-of-offenders element 705, a weapon description drop-down menu 710, and an incident description free-text field 715, to enable the user 105*a* to enter details of the offender(s), their weapons and the incident generally.

The fourth incident reporting screen is generated according to the incident type (in this example an armed person). In the case of other incident types, such as a vehicle bound incident, the weapon description drop-down menu 710 may be replaced by a vehicle description free-text field.

Figure 8:
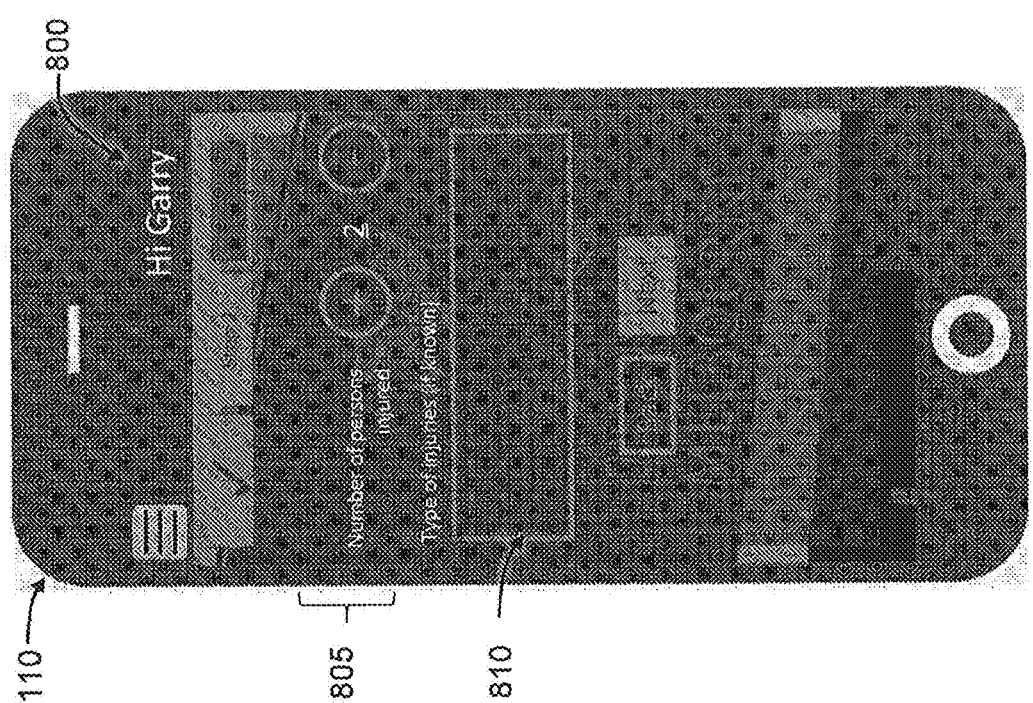
FIG. 8 illustrates a screenshot of the third incident reporting screen with a pop-up element 605 thereon, requesting the user to indicate whether the incident is moving.

Once the offender information is entered, a fifth incident reporting screen of the system 100 is shown, requesting injury information from the user. FIG. 8 illustrates a screenshot 800 of the fifth incident reporting screen of the system 100, as shown to the user 105*a-n* on the smartphone 110 according to an embodiment of the present invention.

The fifth incident reporting screen includes a number-of-persons-injured element 805 and an injury description free-text field 810, to enable the user 105*a* to enter details of the number of person(s) injured, and their injuries.

Figure 9:
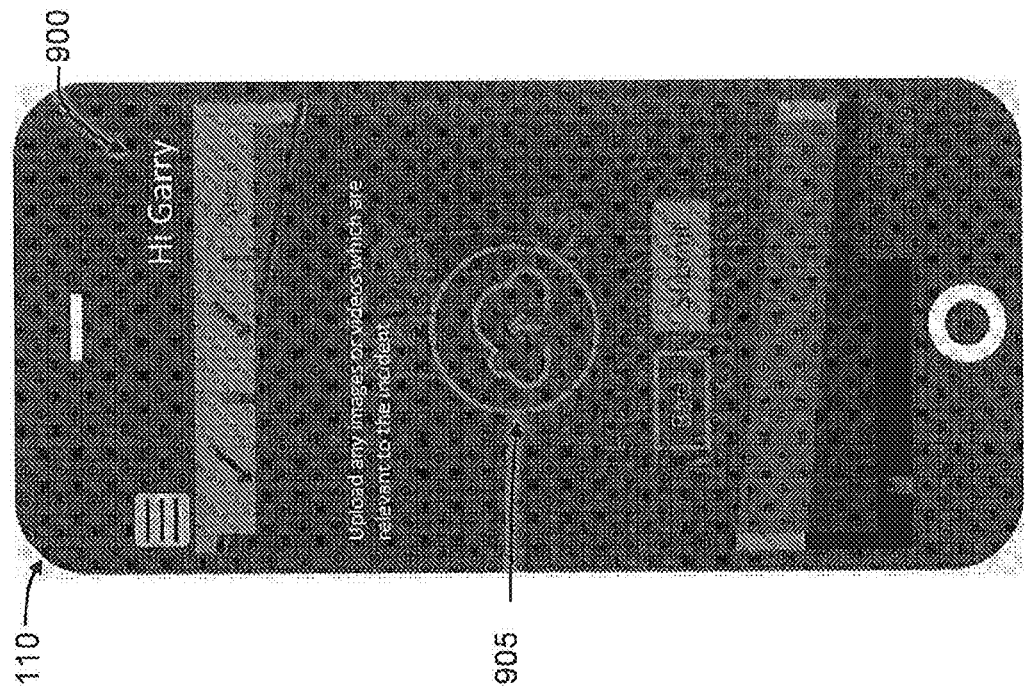
FIG. 9 illustrates a screenshot of a sixth incident reporting screen of the system of FIG. 1, as shown to the user on the smartphone, according to an embodiment of the present invention.

Once the injury information is entered, a sixth incident reporting screen of the system 100 is shown, requesting media (e.g. images or video) from the user relevant to the incident. FIG. 9 illustrates a screenshot 900 of the sixth incident reporting screen of the system 100, as shown to a user 105*a-n* on the smartphone 110, according to an embodiment of the present invention.

The sixth incident reporting screen includes a media upload element 905, to enable the user 105*a* to upload media, such as images or video, relevant to the incident. The media may directly capture the incident (or a part thereof), injuries associated with the incident, or any other aspect relevant to the incident.

Once any media is selected, the responses and media is uploaded to the server 115 as an incident report. The server 115 may perform initial analysis of the incident report. e.g. using Artificial Intelligence to determine one or more recommended response, and allocates the incident to a security user 130 (or other user) for initial investigation on a security user computer 135 coupled to the server 115.

The security user 130 reviews the incident report, and generates an alert to users near the incident (according to their respective location information. The alert may include information relation to the incident (e.g. a shooting is taking place, and its location) and instructions (e.g. run, hide, help, etc) as selected by the security user.

The alerts are then automatically sent to the users 105*b-c* near the incident location using the applications on the smartphones 110. The alerts are then shown to the user as a notification. e.g. on the user's lock or home screen, even if the application is not open.

Figure 10:
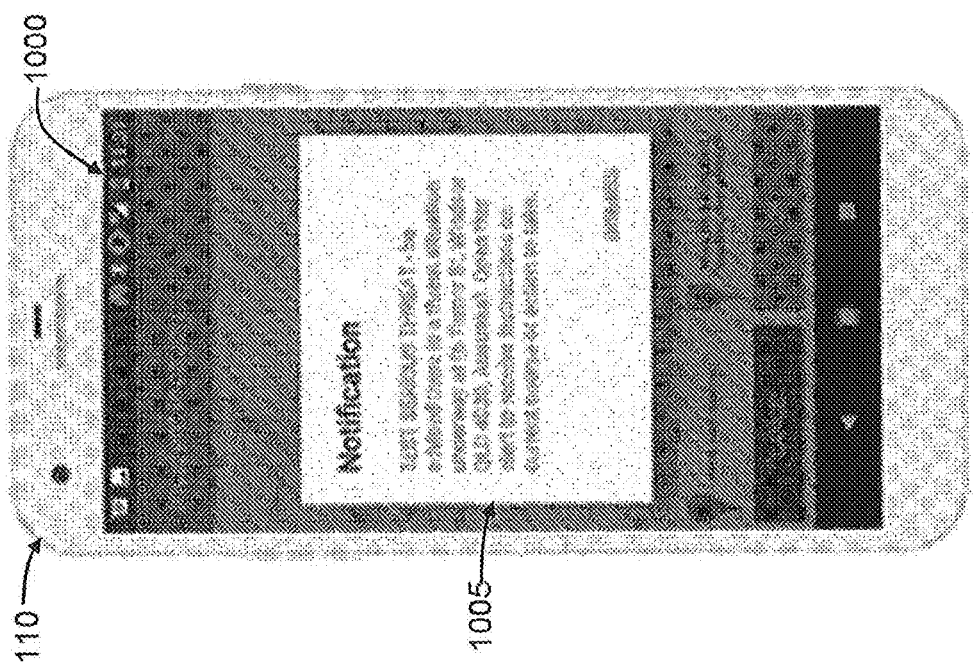
FIG. 10 illustrates a screenshot of an alert provided on a home screen of the user device, according to an embodiment of the present invention.

FIG. 10 illustrates a screenshot 1000 of an alert 1005 in the form of a notification provided on a screen of the user device 110, according to an embodiment of the present invention.

The alert 1005 includes a brief overview of the alert, such as threat type and location.

The user 105*b-c* can open the notification, upon which an indication that the notification has been viewed is recorded, upon which details on the appropriate course of action to take as instructed by the security user 130 are provided in an alert detail screen.

Figure 11:
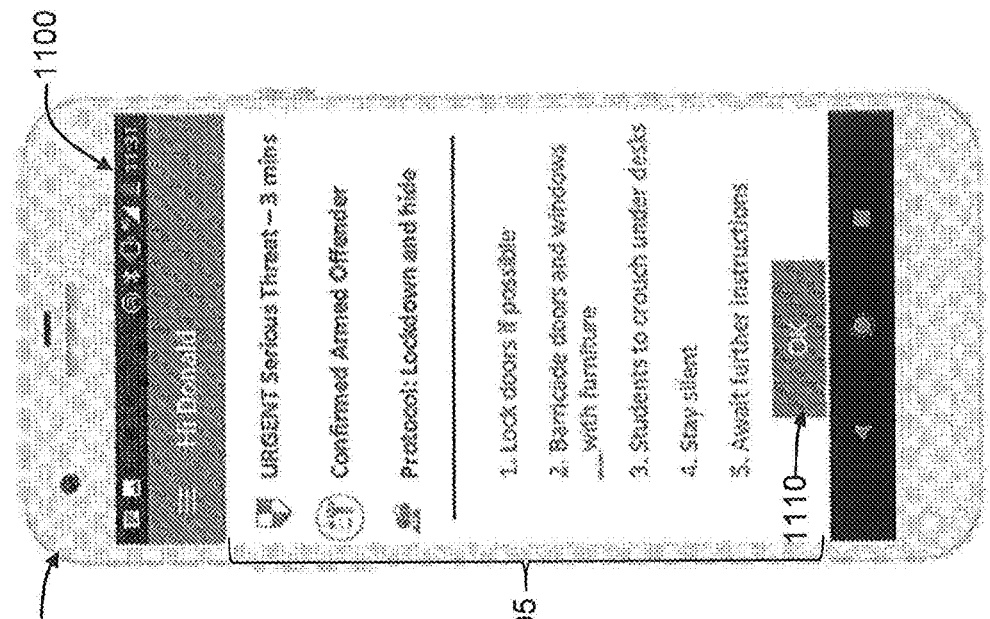
FIG. 11 illustrates a screenshot of an alert detail screen, according to an embodiment of the present invention.

FIG. 11 illustrates a screenshot 1100 of an alert detail screen, according to an embodiment of the present invention. The alert detail screen includes an alert details portion 1105, including details of the incident, as well as instructions. In the example of Figure lithe instructions state that a 'lockdown and hide' protocol is in place, and requests the users to lock doors, barricade doors and windows, for students to crouch under desks, to stay silent and to await further instructions.

The alert detail screen further includes a confirm button 1110, which confirms receipt of the instructions. When selected, an acknowledgement is sent to the server.

Once the instructions are confirmed, a notify contacts screen is provided to enable the user to notify his or her contacts of the incident. This is particularly useful in that it enables information to be quickly disseminated to relevant persons.

Figures 12, 13:
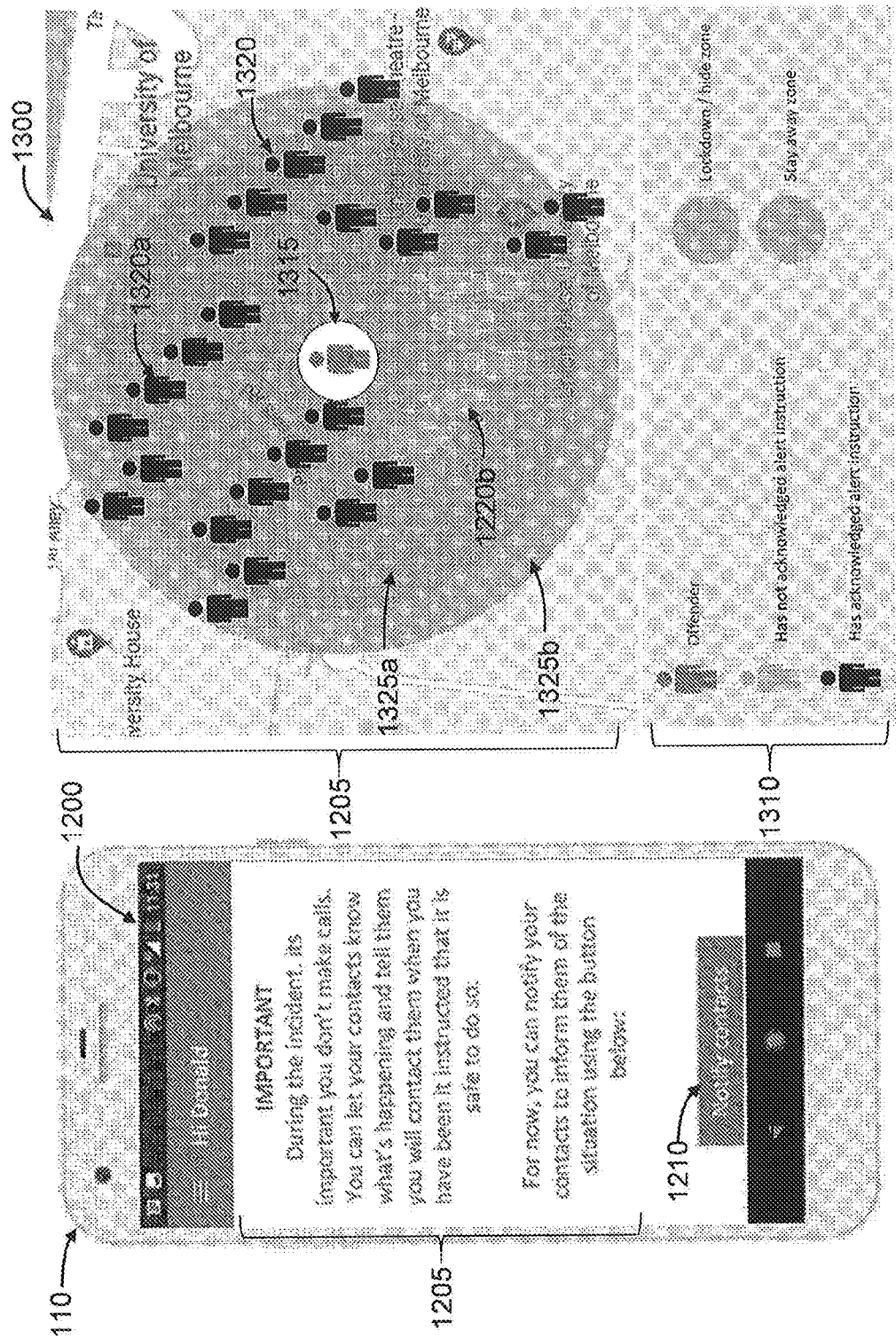
FIG. 12 illustrates a screenshot of a notify contacts screen, according to an embodiment of the present invention.
FIG. 13 illustrates a screenshot of an incident overview screen, as shown to a security user on a computing device, according to an embdoiment of the present invention.

FIG. 12 illustrates a screenshot 1200 of a notify contacts screen, according to an embodiment of the present invention.

The notify contacts screen includes a notify contacts information portion 1205, including information regarding making contact with the user's contacts. In the example of FIG. 11 the information states that it is important not to make telephone calls during the incident, and to notify contacts using a notify contact button 1210 provided by the system.

The notify contact button 1210 enables the user to notify some or all of his or her contacts of the incident. This may include automatically sending a notification to some or all of the user's contacts, or enabling the user to manually select which contacts the notification is sent to.

In some embodiments, the system enables the use of legacy communication methods, such as text messaging and the like, to be used for notifying the user's contacts. In such case, a summary of the indecent may be sent to the user's contacts, together with a link (URL) to further information.

As mentioned above, the security user 130 is also provided with a graphical user interface, which provides an overview of the incident and the associated users.

FIG. 13 illustrates a screenshot 1300 of an incident overview screen, as shown to the security user 130 on the computing device 135, according to an embodiment of the present invention.

The incident overview screen includes a map element 1305, and an associated legend element 1310. An incident element 1315 is provided on the map element 1305, to indicate a location of the incident. A plurality of other user elements 1320 are provided on the map, to illustrate a location of the other users relative to the incident.

The other user elements 1320 are colour coded such that they indicate first user elements 1320*a*, which correspond to users that have acknowledged the alert instructions, and second user elements 1320*b*, which correspond to users that have not acknowledged the alert instructions.

First and second zones 1325*a*. 1325*b* are also provided on the map element 1305 around the incident element 1315. The first zone 1325*a* corresponds to a lockdown/hide zone, and the second zone 1325*b* corresponds to a stay away zone. According to certain embodiments, different alerts and instructions are provided to users in the different zones.

While the zones 1325*a*, 1325*b* are illustrated as being circular in shape, the skilled addressee will readily appreciate that the zones may have any suitable shape.

In some embodiments, the security user 130 may select a particular region (e.g. within 500 m or 1 km of the incident) to define the zones, based upon the nature of the incident. As an illustrative example, an alert about a fire in a building may be sent to users in a relatively small area, whereas a vehicle bound incident may be sent to users in a relatively large area (particularly if the offender is moving quickly).

Furthermore, the security user 130 may generate updated alerts based upon a change in an incident, or if further information is made available about an incident. The updated alerts may be provided to the same or a different group of users, dependent on the circumstances.

A second user 105*b* may also observe the incident and report the incident in a similar manner to that described above. In this regard, the server 115 applies Artificial Intelligence to the incident reports to determine if they relate to an existing known incident, and in such case any further reports are forwarded to the associated security user 130. In some embodiments, the server 115 may identify "new" information from subsequent reports, and selectively forward the new information to the security user, to prevent the same information being sent over and over to the security user. As such, the system need not deal with related reports individually but may consider these together The server 115 may be configured to combine incident reports automatically, e.g. by averaging or otherwise, essentially enabling crowd reporting of incidents. As such, security users may be provided with an accurate collation of the incident reports, which enables action to be taken more swiftly when compared with manual collation of the incident reports.

In the event of a serious incident and once the user's have complied with the alert instructions, a blanket message may be sent to an emergency contact list (e.g. built during the initial registration process), or those that have responded to the notification. e.g. informing the users that they are OK and not to contact them until further notice.

Messages may be sent via the system, rather than mobile networks, as in the event of a serious threat, these networks may be cut by emergency response personnel, may be jammed by excessive simultaneous communication or may contribute to the incident in the event of an explosive device.

Once an incident is contained, an alert is sent to all users that have previously received an alert indicating that the incident is contained. The alert may also include instructions or information, such as transport instructions in case transport issues have been caused by the incident.

In addition to the user alerts described above, detailed reports are provided to first responders. The reports may include, but are not limited to, ( ) type of incident, (u) a number of offenders, (ii) a description of offender/s, (iv) weapons used or present, (vi) further description of incident location (critically tracks incident movement), (vii) number of persons injured, (vii) types of injuries, and/or (x) upload of photographic or video recording of incident.

All of the above details may be provided in incident reports of one or more users, and enables the first responders to prepare for the incident (e.g. allocate sufficient resources), and also stay safe.

In some embodiments, the system may be configured to generate and provide real time (or near real time) heat maps and tracking details of offenders and their proximity to people.

Furthermore, the system may enable users to communicate with each other during an incident, e.g. by providing chat or messaging functionality. This enables communications to be targeted to relevant roles within an organisaton during an incident.

In addition to handling an incident, the system may be configured to generate post incident reports, e.g. for management, first responders or relevant stakeholders (e.g. insurance companies), including incident data, response metrics, and/or how communication was managed during the incident. This enables those managing the incident to generate appropriate reports, provide information to law enforcement, and to identify areas for improvement.

As an illustrative example, a report may be generated including: name of witnesses and contact details of users who reported through the system; what each user reported and the time it was reported; any photographs or videos that were uploaded; all alerts that were sent out during the incident; in-app conversations between users and security controllers; and the heat map that was generated during the incident (multiple maps for multiple simultaneous incidents).

While the above system has been described with reference to mobile phones, messages may alternatively or additionally be automatically generated message onto the desktop of a personal computer. Such configuration is particularly useful in a work or educational environment where users are working on a computer.

Advantageously, and as outlined above, the system 100 provides the users with the capability of reporting in real time details of an incident (i.e. as it is occurring), including precise location information as well as specifics of the incident. This enables alerts to be quickly made to users, which enables those other users to stay safe during the incident.

Figure 14:
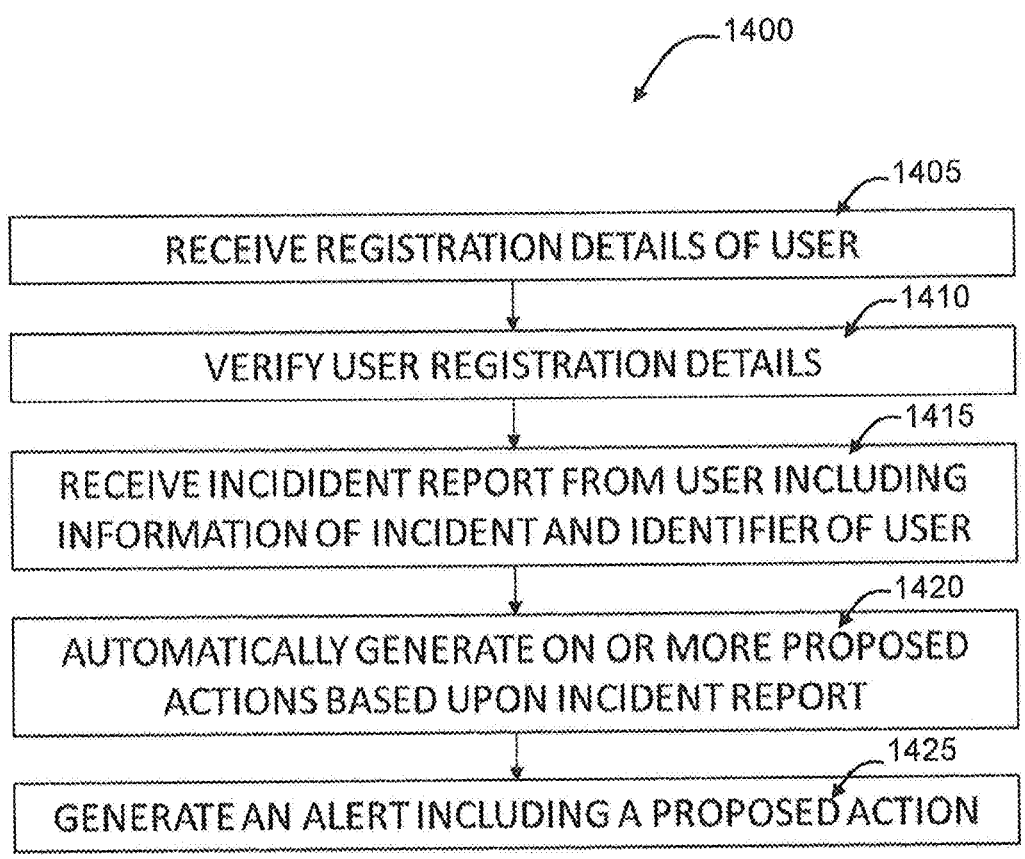
FIG. 14 illustrates an incident reporting an alert method, according to an embodiment of the present invention.

FIG. 14 an incident reporting and alert method 1400, according to an embodiment of the present invention. The method 1400 may be implemented using the system 100.

At step 1405, registration details of a user are received. The registration details are generally provided by the user in a registration process when an application, such as that described in the context of the system 100, is installed for the first time.

At step 1410, the registration details of the user are verified. This may be performed using any suitable means and to any suitable extent, but would generally include receiving a telephone number of the user, or other information that can be verified using external databases.

At step 1415, an incident report is received. The incident report may be generated using the user interface described with reference to FIGS. 2-9, and includes an identifier of the user making the report, a location associated with the incident, and information relating to the incident.

The incident report is encrypted to prevent both unauthorised access to the information, and to be able to verify an authenticity of the report. This may be performed using a proprietary identity management system based on OpenID Connect/OAuth2, for example.

At step 1420, one or more proposed actions are generated based upon the incident report. The actions may include staying indoors in the case of a vehicle-based incident, or hiding in case of a shooting.

At step 1425, an alert is generated based upon the proposed action, and after review by a security personnel, and is transmitted to users in proximity of the incident.

The systems and method described above may be tailored to a specific organisation, to meet organisational requirements. Furthermore, the systems and methods may be adapted to provide information from the reports for statistical analysis and compliance reporting.

As an illustrative example, the systems and methods may be used with staff or students of a particular organisation. In particular, the systems and methods may be used to send coordinated proximity-based alerts and instructions to the staff or students.

In addition to the urgent reporting described above, the systems may be used for non-urgent and/or other incident reporting, such as (but not limited to) reporting a suspicious, unattended bag, a suspicious person or a minor theft, gang activity, or wilful damage (not in progress). Furthermore, the systems may be used to report HR issues, such as (but not limited to) bullying and harassment (sexual or otherwise), or to alert users of a health issue (flu epidemic).

The use of non-urgent and/or other incident reporting is an important mechanism for reducing the likelihood of non-urgent and/or other incidents escalating to urgent incidents, by providing the necessary intelligence for early intervention.

Urgent incidents, such as life endangering or life threatening featuring an armed person, hostile vehicle, fire/explosion, self-harm or a medical emergency, may be reported distributed to others without delay. Non-urgent and/or other incident reports may be reviewed and distributed to users on a case-by-case basis.

The system may be configured such that users that are able to make the reports (i.e. the reporters) are known to the organisation receiving the reports, and are authenticated using an OpenID Connect/OAuth2 authentication system. In such case, as anonymous reporting is not provided, the likelihood of false reports being lodged is significantly reduced.

In some embodiments, the system may be configured to send reports or notifications automatically based upon the user making the report. As an illustrative example, the system may be configured to send notifications to parents and guardians when an incident has been reported by their child.

In addition to be used with incidents directly, the system may be configurable to operate in drill (simulation) modes, allowing users to conduct emergency response training drills in co-ordination with your security team and local emergency responders. This may be particularly useful in enhancing usability and user familiarity of the system. The system can also be used to disseminate training information and other important messages or information to the organizational and basic user group.

Furthermore, the system may include a dashboard, enabling managerial staff to get an overview of incidents, HR issues or the like. In this regard, the system may be configured to provide security monitoring via a dedicated application, or a secure API to plug-in to a third-party monitoring system.

The systems and methods described above may combine artificial intelligence with the 'wisdom of the crowd' to provide predictive pre-crime analytics and real time critical information to a mass audience, security controllers, personnel assistance staff and emergency first responders.

Advantageously, the systems and methods described above are easy to use, both by users reporting and those receiving the alerts, as well as by security users and other officials using the system. As such, the system may be used by a broad audience, including by children in middle school (and above), and with children aged 9 years and above. The system may offers simpler, e.g. "one touch" reporting functions, with clear and concise instructions for ease of use with such children.

The systems and methods enable users to quickly and accurately report incidents, including detailed location information, as well as be alerted of incidents in their vicinity. As a result, users are able to become aware of an incident in a timely manner (or make others aware), and thus take appropriate action, which can in turn reduce the impact and casualty rates of such incidents.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A real-time, interactive incident reporting and alert system including at least one server configured to:
    receive, from a user device, an incident report, the incident report including an identifier of a user associated with the user device, a location associated with an incident, and information relating to the incident;
    identify a plurality of users in proximity to the location; and
    transmit an alert to a plurality of user devices associated with the plurality of users to inform the plurality of users of the incident;
    wherein the at least one server is configured to provide a graphical user interface (GUI) to the user device, the GUI enabling the user to generate the incident report;
    wherein the GUI enables the user to select the location with reference to a map element and
    wherein the GUI enables the user to select whether the incident is moving, and in such case input a direction of movement associated with the incident.

2. The system of claim 1, wherein the at least one server is configured to receive details of an identity of the user, and associate the identity of the user with the user device.

3. The system of claim 1, wherein the at least one server is further configured to verify the identifier of the user.

4. The system of claim 1, wherein the at least one server is configured to identify a location of each of the plurality of users at least partly prior to receiving the incident report, in order to identify the plurality of users in proximity to the location of the incident.

5. The system of claim 1, wherein the at least one server is further configured to determine one or more recommended responses based upon the incident report, and provide the recommended response to a security user.

6. The system of claim 1, wherein the at least one server is configured to automatically allocate the incident to a security user of a plurality of security users for initial action.

7. The system of claim 6, wherein the at least one server is configured to receive an alert configuration from the security user, and generate the alert based thereon.

8. The system of claim 7, wherein the alert configuration includes information defining a proximity to the incident defining the plurality of users to which the alert is to be sent.

9. The system of claim 1, wherein the at least one server is configured to generate updated alerts based upon a change in an incident, or if further information is made available about an incident.

10. The system of claim 1, wherein the at least one server is configured to receive multiple incident reports from multiple users, and automatically identify common incidents based on the multiple incident reports.

11. The system of claim 10, wherein the at least one server is configured to automatically identify new information from subsequent reports, and selectively forward the new information to a user.

12. The system of claim 1, wherein the location of the incident report may define the location of the user and the location of the incident.

13. The system of claim 1, wherein the alert is selectable, upon which further information and/or instructions relating to the incident are opened.

14. The system of claim 13, wherein the alert enables the user to confirm receipt of the instructions thereof.

15. The system of claim 13, wherein the information and/or instructions may be provided based upon the user's proximity to the incident, and wherein the user's proximity to the incident is defined according to zones.

16. The system of claim 1, wherein the at least one server may be configured to provide a GUI to one or more first responders and/or security users, the GUI including, a map based representation illustrating a location of offender(s), their movements and proximity to users in accordance with one or more zones.

17. A real-time, interactive incident reporting and alert method including:
- receiving, from a user device, an incident report, the incident reports including an identifier of a user associated with the user device, a location associated with an incident, and information relating to the incident;
- identifying a plurality of users in proximity to the location; and
- transmitting an alert to a plurality of user devices associated with the plurality of users to inform the plurality of users of the incident;
- wherein the method includes providing a graphical user interface (GUI) to the user device, the GUI enabling the user to generate the incident report, select the location with reference to a map element, select whether the incident is moving, and in such case input a direction of movement associated with the incident.

* * * * *